US010300861B1

(12) United States Patent
Green et al.

(10) Patent No.: US 10,300,861 B1
(45) Date of Patent: May 28, 2019

(54) MODULAR VEHICLE PAD

(71) Applicant: Cache Inc., Cottonwood Heights, UT (US)

(72) Inventors: Dillon Green, Cottonwood Heights, UT (US); Tyler Green, Cottonwood Heights, UT (US)

(73) Assignee: Cache Inc., Cottonwood Heights, UT (US)

( * ) Notice: Subject to any disclaimer, the term of this patent is extended or adjusted under 35 U.S.C. 154(b) by 0 days.

(21) Appl. No.: 15/917,455

(22) Filed: Mar. 9, 2018

(51) Int. Cl.
*B60R 7/02* (2006.01)
*B60R 7/00* (2006.01)

(52) U.S. Cl.
CPC ............. *B60R 7/005* (2013.01); *B60R 7/02* (2013.01)

(58) Field of Classification Search
CPC .......... B60R 7/043; B60R 7/005; B60R 7/02; B60R 13/01; B60R 2013/016; B60R 9/06
USPC .......................... 224/275, 402–404, 543, 572
See application file for complete search history.

(56) References Cited

U.S. PATENT DOCUMENTS

| | | | | |
|---|---|---|---|---|
| 3,014,759 A * | 12/1961 | Bing | ................. | B60R 7/043 224/275 |
| 4,650,103 A * | 3/1987 | Mitchell | ................. | B60N 2/242 224/275 |
| 5,255,464 A * | 10/1993 | Marecek | ................. | G09F 21/048 40/588 |
| 6,286,885 B1 * | 9/2001 | Ramos | ................. | B60R 13/01 296/136.07 |
| 8,061,761 B1 * | 11/2011 | Sierra | ................. | B60J 11/06 296/136.01 |
| 9,522,767 B1 * | 12/2016 | Pass | ................. | G09F 21/04 |
| 9,701,225 B1 * | 7/2017 | Hogan | ................. | B60N 2/3095 |
| 2004/0262345 A1 * | 12/2004 | Polburn | ................. | B60R 7/005 224/275 |
| 2005/0230443 A1 * | 10/2005 | Bredeson | ................. | B60R 7/043 224/275 |
| 2006/0283899 A1 * | 12/2006 | Hill | ................. | B60R 7/043 224/275 |
| 2008/0203752 A1 * | 8/2008 | Warkentin | ................. | B62D 33/0273 296/57.1 |

OTHER PUBLICATIONS

Tailgate Locker. (RMU). Retrieved Apr. 20, 2018, from https://rmuoutdoors.com/products/the-gate-keeper.

* cited by examiner

*Primary Examiner* — Corey N Skurdal
(74) *Attorney, Agent, or Firm* — Maschoff Brennan

(57) ABSTRACT

A vehicle pad may include at least a first layer defining a layer hole to permit access to a handle of a vehicle. The vehicle pad may include attachment devices within pockets defined by the at least the first layer. The vehicle pad may include straps that include first and second ends. The straps may be configured to pass through a hinge gap to secure the vehicle pad to the vehicle. The vehicle pad may include a lock that includes first and second lock straps and a locking piece. The second lock strap may attach to the locking piece and positioned adjacent to a surface of the at least the first layer. The first lock strap may attach to the second lock strap and configured to pass through the hinge gap and attach to the locking piece. The lock may be configured to lock the vehicle pad to the vehicle.

20 Claims, 11 Drawing Sheets

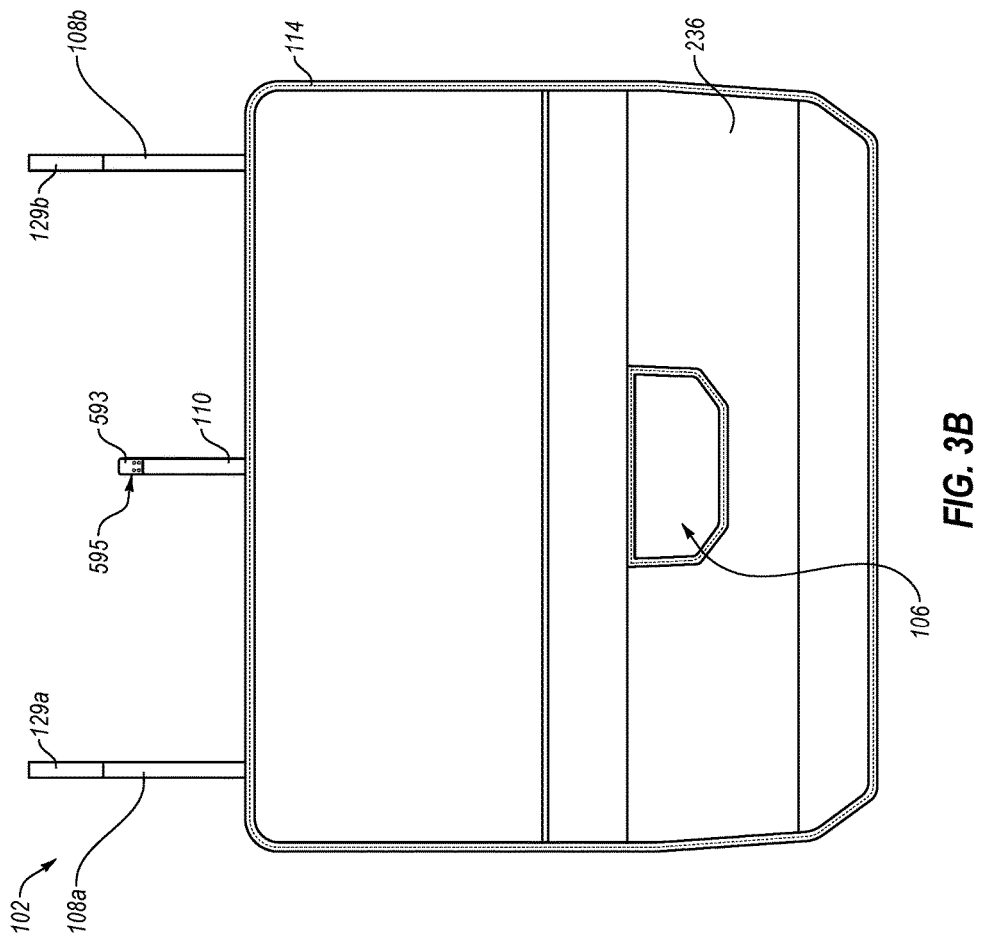

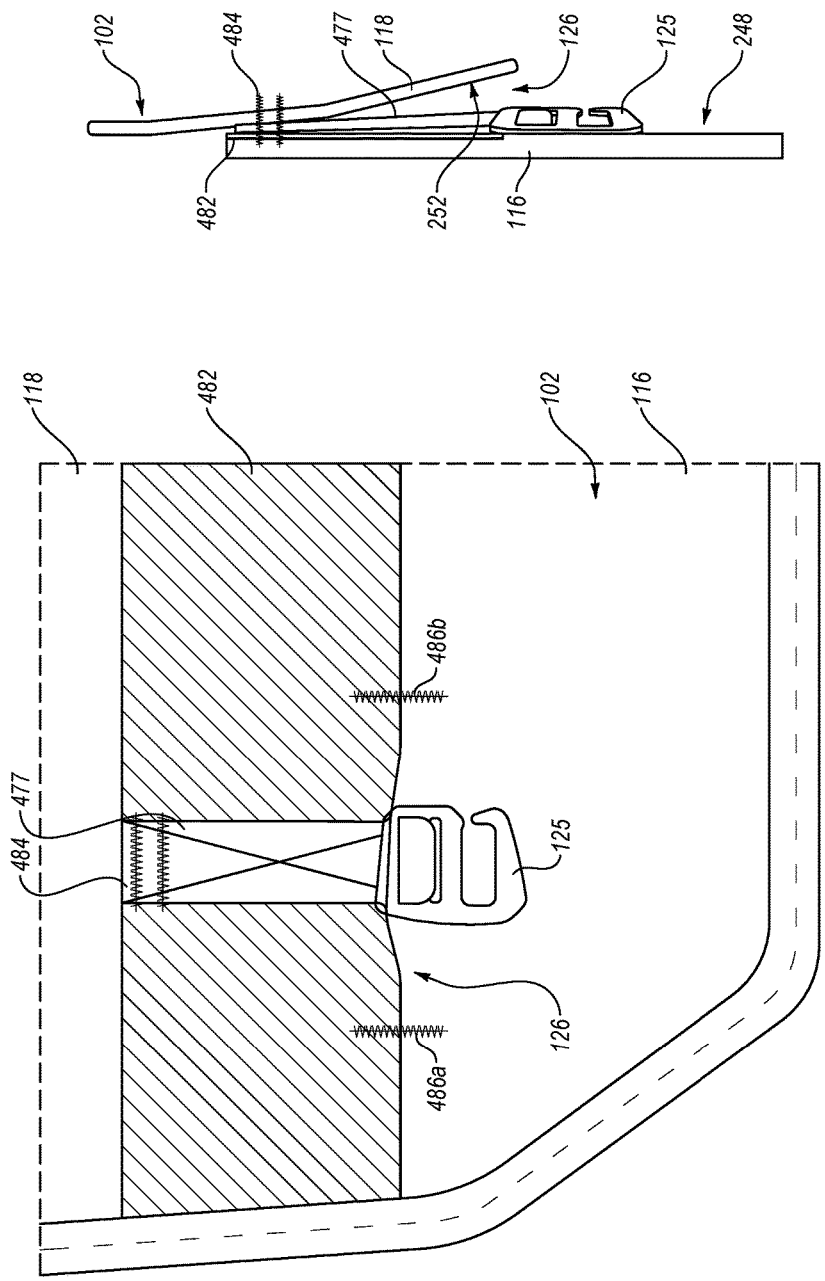

MODULAR VEHICLE PAD

FIELD

The embodiments discussed herein are related to a modular vehicle pad.

BACKGROUND

Vehicles (e.g., trucks) have made transporting items much easier than before. One issue with transporting items using a vehicle is securing the items to the vehicle without causing damage to the vehicle and/or to the items being transported. Protective equipment that does not lock to the vehicle creates a risk of theft of the protective equipment.

The subject matter claimed herein is not limited to embodiments that solve any disadvantages or that operate only in environments such as those described above. Rather, this background is only provided to illustrate one example technology area where some embodiments described herein may be practiced.

SUMMARY OF SOME EXAMPLE EMBODIMENTS

In an example embodiment, a vehicle pad may include at least a first layer. The first layer may define a layer hole positioned to permit access to a handle of a vehicle. The vehicle pad may also include multiple attachment devices. Each attachment device may be positioned within a different attachment pocket defined by the at least the first layer. The vehicle pad may additionally include one or more webbing straps. The webbing straps may include a first end and a second end. The webbing straps may be configured to pass through a hinge gap of a vehicle. The first end may be configured to attach to a first attachment device. The second end may be configured to attach to a second attachment device. The webbing straps may be configured to secure the vehicle pad to the vehicle. The vehicle pad may include a locking device. The locking device may include a first lock strap, a second lock strap, and a locking piece. The second lock strap may be attached to the locking piece. The second lock strap may be positioned adjacent to at least one surface of the at least the first layer. The first lock strap may be attached to the second lock strap. The first lock strap may be configured to pass through the hinge gap and attach to the locking piece. The locking device may be configured to lock the vehicle pad to the vehicle.

In another example embodiment, a vehicle pad may include a first layer. The vehicle pad may also include a second layer. A first surface of the second layer may be in contact with a second surface of the first layer. The vehicle pad may additionally include a third layer that includes a first portion and a second portion. A first surface of the first portion may be in contact with a first portion of a second surface of the second layer. A first surface of the second portion may be in contact with a second portion of the second surface of the second layer. The vehicle pad may include a fourth layer. A first surface of the fourth layer may be in contact with a third portion of the second layer and a portion of a second surface of the first portion of the third layer. The first surface of the fourth layer may also be in contact with a portion of a second surface of the second portion. The vehicle pad may also include a locking device. The locking device may include a first lock strap, a second lock strap, and a locking piece. The second lock strap may be attached to the locking piece. The second lock strap may be positioned between the second surface of the second layer and the first surface of the fourth layer. The first lock strap may be attached to the second lock strap. The first lock strap may be configured to pass through a hinge gap and attach to the locking piece. The locking device may lock the vehicle pad to a vehicle.

In yet another embodiment, a truck pad may include a first layer. The first layer may define a first layer hole positioned to permit access to a tailgate handle of a tailgate. The truck pad may also include a second layer. A first surface of the second layer may be in contact with a second surface of the first layer. The second layer may define a second layer hole positioned to permit access to the tailgate handle. The truck pad may additionally include a third layer. A first surface of the third layer may be in contact with a first portion of a second surface of the second layer. The truck pad may include a fourth layer. A first surface of the fourth layer may be in contact with a second portion of the second surface of the second layer. The truck pad may also include a fifth layer. A first surface of the fifth layer may be in contact with a third portion of the second layer and a portion of a second surface of the third layer. A portion of a second surface of the fourth layer and the fifth layer may define a fifth layer hole positioned to permit access to the tailgate handle. The truck pad may additionally include an edging. The edging may be configured to bind the first layer, the second layer, the third layer, the fourth layer, and the fifth layer along a perimeter of the truck pad. The truck pad may include a plurality of bump-out straps attached to the second surface of the fifth layer. Each of the bump-out straps may be located at different positions. The bump-out straps may be attached to be adjacent to a third side of the tailgate when the truck pad is secured to the tailgate. The truck pad may also include a payload strap. The payload strap may be configured to pass through one or more of the bump-out straps to adjust a size and position of a payload loop using the bump-out straps. The payload loop may be configured to permit a payload to be secured to the truck pad. The truck pad may additionally include a molle webbing device attached to the second surface of the fifth layer. The molle webbing device may be attached to be adjacent to a second side of the tailgate when the truck pad is secured to the tailgate. The molle webbing device may be configured to attach modular accessories to the truck pad. The truck pad may include multiple tension locks. Each tension lock may be positioned within a different attachment pocket defined by the third layer and the fifth layer or the fourth layer and the fifth layer. The truck pad may also include one or more webbing straps including a first end and a second end. The webbing straps may be configured to pass through a tailgate hinge gap. The first end may be configured to attach to a first tension lock and the second end may be configured to attach to a second tension lock to secure the truck pad to the tailgate. The tension locks may be configured to maintain tension on the webbing straps when the truck pad is secured to the tailgate. The truck pad may additionally include a locking device that includes a first lock strap, a second lock strap, and a locking carabiner. The second lock strap may be attached to the locking carabiner. The second lock strap may be positioned between the second surface of the second layer and the first surface of the fifth layer. The first lock strap may be attached to the second lock strap. The first lock strap may be configured to pass through the tailgate hinge gap and attach to the locking carabiner to lock the truck pad to the tailgate.

These example embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

FIG. 3B illustrates another orthogonal view of the modular vehicle pad of FIGS. 1A-1C;

FIG. 4A illustrates an example attachment pocket of the modular vehicle pad of FIGS. 1A-1C;

FIG. 4B illustrates a sectional view of the attachment pocket of the modular vehicle pad of FIGS. 1A-1C;

DETAILED DESCRIPTION

Figure 1A:
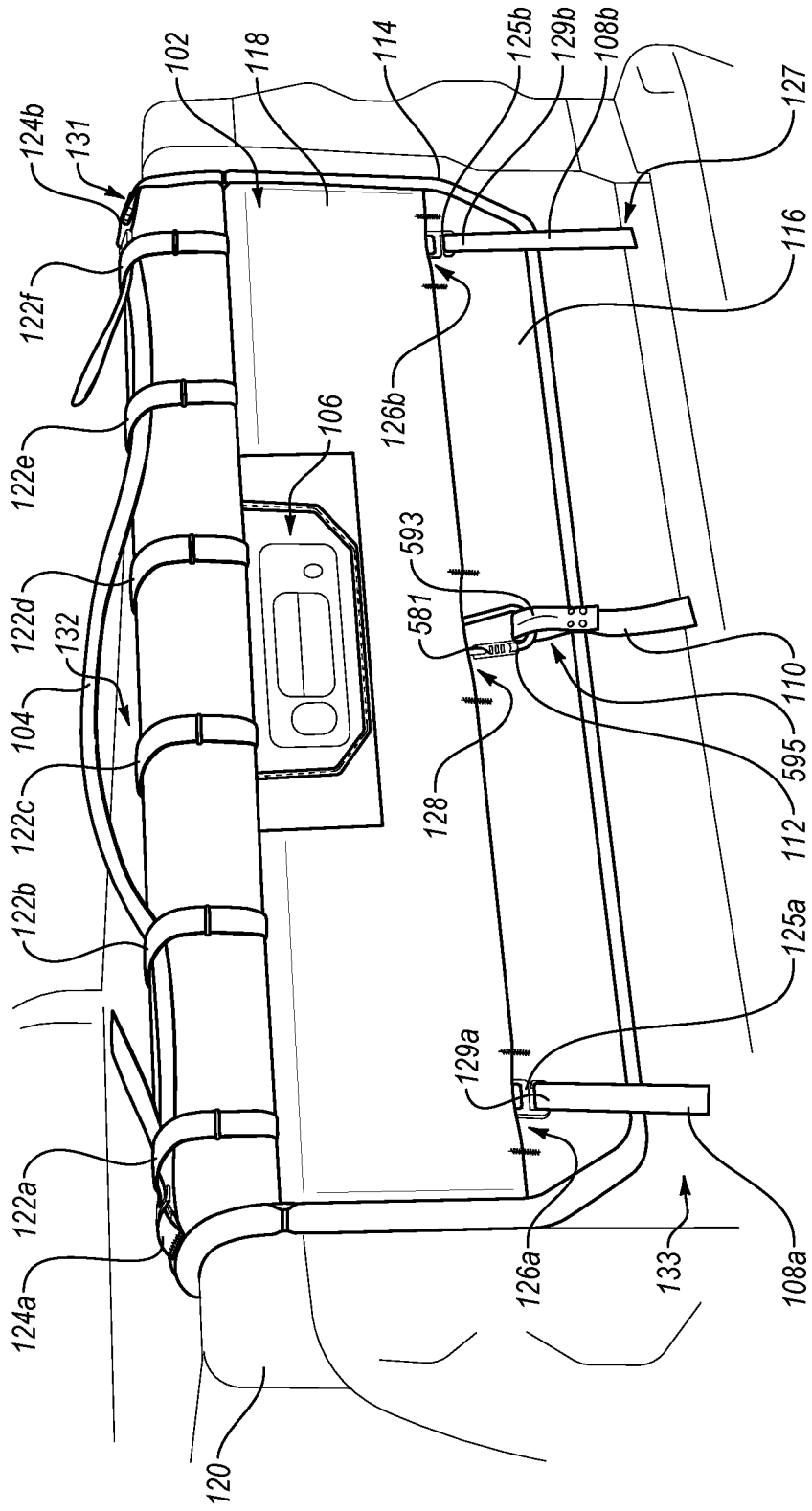
FIG. 1A illustrates a perspective view of an example modular vehicle pad.

A modular vehicle pad (herein 'vehicle pad') that is configured to attach to a tailgate of a vehicle may be used to reduce and/or eliminate damage to the vehicle caused by the items and/or damage to the items that are being transported. The vehicle pad may include a locking device, one or more webbing straps, and a molle webbing device. The locking device may lock the vehicle pad to the vehicle. The vehicle pad may be attached to the tailgate by strapping the vehicle pad to the vehicle using the one or more webbing straps.

The molle webbing device may be configured to attach and secure one or more modular accessories to the vehicle pad. The modular accessories may be securely attached and accessible when the tailgate is in an opened state or a closed state. The molle webbing device may include one or more straps attached to a surface of the vehicle pad. For example, the molle straps may be attached by stitches along a length of the molle straps that are positioned a particular distance apart from each other. Attaching the molle straps using stitches positioned a particular distance apart from each other may form multiple openings between the molle straps and the surface of the vehicle pad. The modular accessories may be attached to the vehicle pad via one or more of the openings between the molle straps and the surface of the vehicle pad using one or more molle attachment devices. The various modular accessories may be interchangeable so that the number and/or type of modular accessories attached to the vehicle pad may be changed based on user preferences.

The locking device of the vehicle pad may include a first lock strap, a second lock strap, and a locking piece. The second lock strap may be positioned between multiple layers of the vehicle pad to prevent access to the second lock strap. A first end of the second lock strap may be attached to the locking piece and a second end of the second lock strap may be attached to a first end of the first lock strap. The first lock strap may include a second end that includes a locking loop. The first lock strap may be configured to pass through a hinge gap and to attach the locking loop to the locking piece to lock the vehicle pad to the vehicle. In some embodiments, the first lock strap and the second lock strap may be connected to each other to form a contiguous strap. In these and other embodiments, a portion of the contiguous strap may be positioned between multiple layers of the vehicle pad.

The vehicle pad may also include one or more bump-out straps and a payload strap configured to secure a payload to the vehicle pad. For example, the bump-out straps may be attached to the surface of the vehicle pad by stitches positioned a particular distance apart from each other. The payload strap may be configured to pass through one or more gaps defined by the bump-out straps and the surface of the vehicle pad. A size and/or a position of a payload loop created by passing the payload strap through one or more of the gaps defined by the bump-out straps and the surface of the vehicle pad may be adjusted by changing which gaps the payload strap passes through. The payload strap may include multiple attachment devices configured to attach ends of the payload strap to payload attachment loops located on the vehicle pad. The attachment devices may also be configured to maintain tension of the payload strap when securing a payload to the vehicle pad.

Figure 1B:
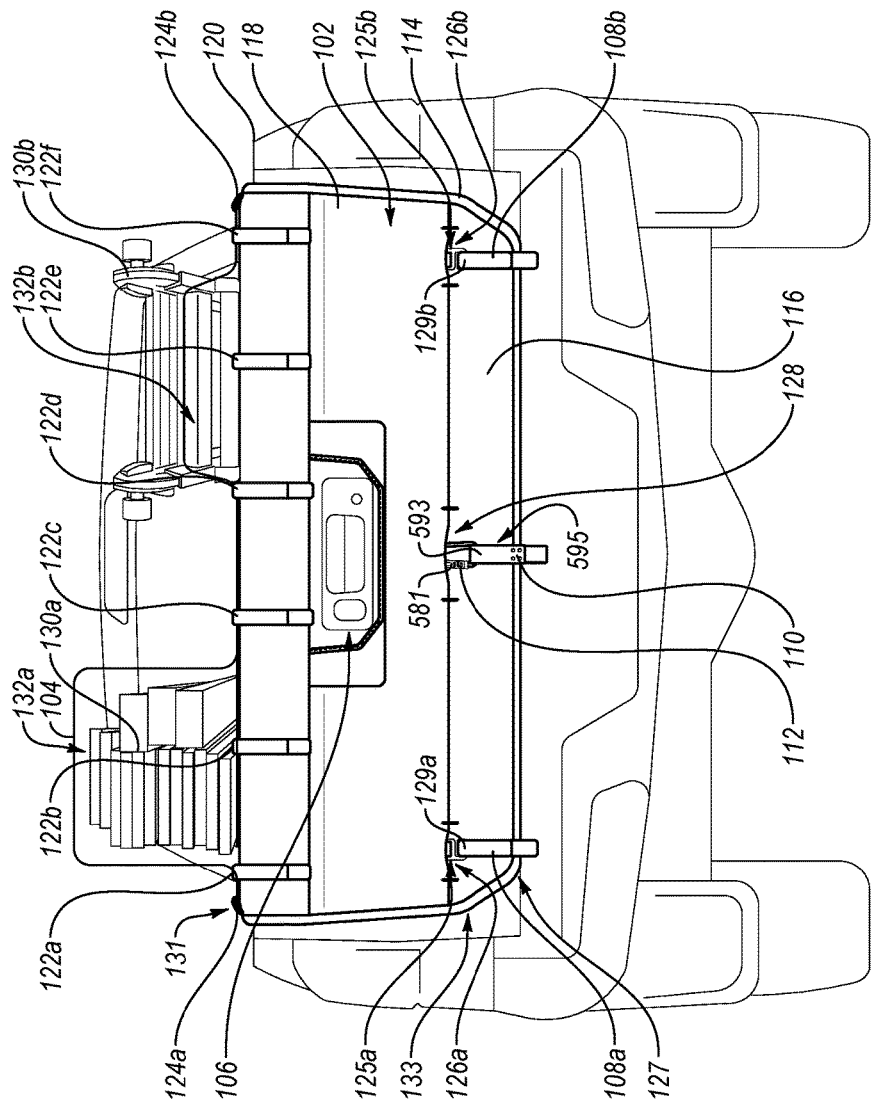
FIG. 1B illustrates another perspective view of the modular vehicle pad.
Figure 1C:
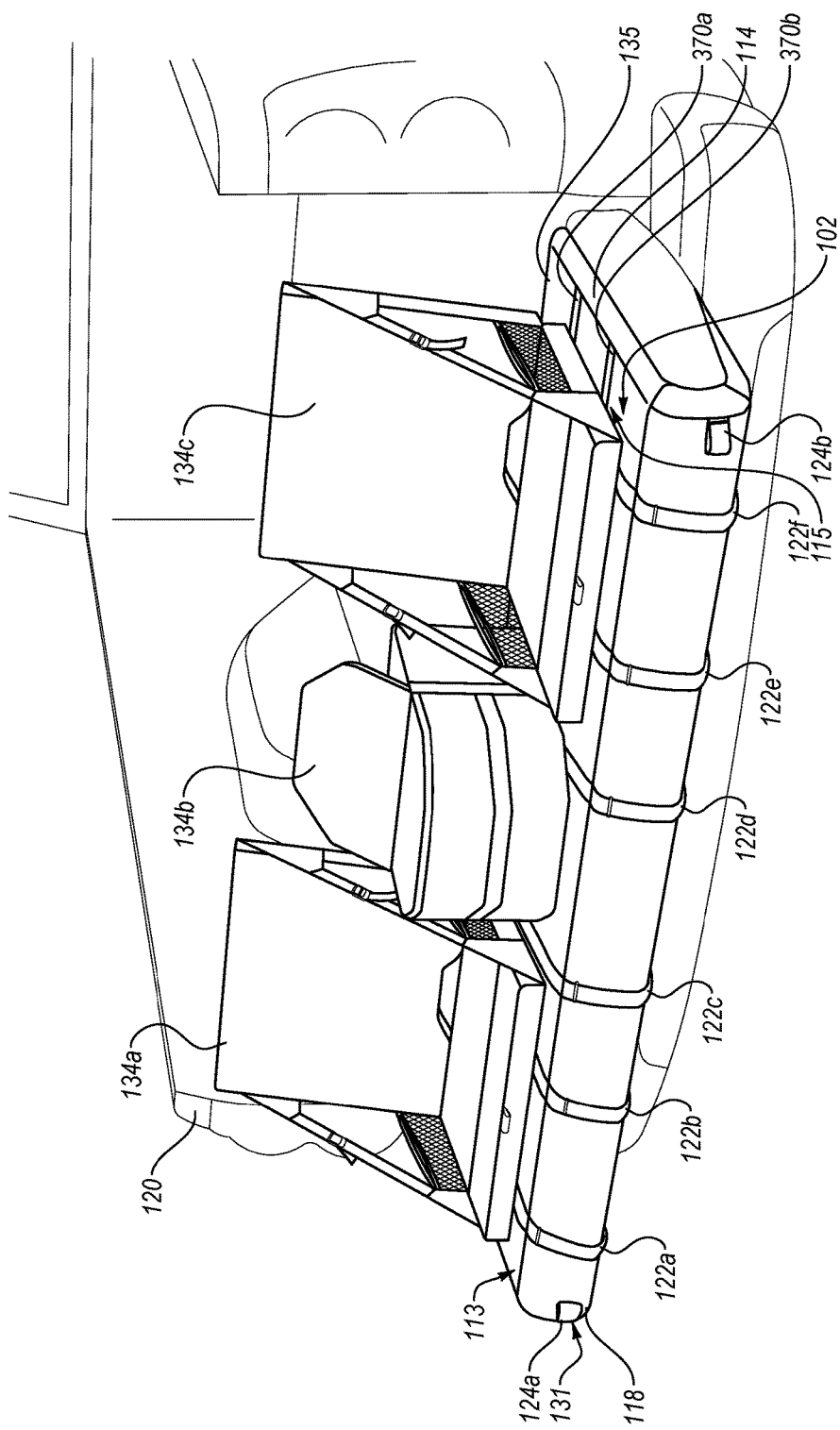
FIG. 1C illustrates another perspective view of the modular vehicle pad.

FIGS. 1A, 1B, and 1C are perspective views of an example modular vehicle pad 102, arranged in accordance with at least one embodiment described herein. The modular vehicle pad 102 may be attached to a vehicle tailgate (herein 'tailgate') of a vehicle 120. The vehicle 120 illustrated in FIGS. 1A-1C is provided for example purposes only and it will be understood that the vehicle 120 may include any appropriate vehicle.

FIG. 1A is a perspective view of the modular vehicle pad 102 (herein 'vehicle pad 102') attached to the tailgate with the tailgate in a closed position. FIG. 1B is a perspective view of the vehicle pad 102 attached to the tailgate with the tailgate in the closed position and the vehicle pad 102 securing a first payload 130a and a second payload 130b (collectively 'payloads 130') to the vehicle pad 102. FIG. 1C is a perspective view of the vehicle pad 102 including a first modular accessory 134a, a second modular accessory 134b, and a third modular accessory 134c (collectively 'modular accessories 134') attached to the vehicle pad 102. In FIG. 1C, the vehicle pad 102 is attached to the tailgate with the tailgate in an open position. With combined reference to FIGS. 1A-1C, the vehicle pad 102 may be employed in securing the payloads 130 to the vehicle pad 102 and/or attaching the modular accessories 134 to the vehicle pad 102.

The vehicle pad 102 may include a fifth layer 118 (shown e.g., in FIGS. 1A-1C), a third layer 116 (shown e.g., in FIGS. 1A and 1B), and a fourth layer 135 (shown e.g., in FIG. 1C).

A portion of the fifth layer 118 and a portion of the third layer 116 may overlap. Additionally, a different portion of the fifth layer 118 and a portion of the fourth layer 135 may overlap. The third layer 116, the fourth layer 135, and the fifth layer 118 are discussed in more detail below in relation to FIG. 2.

A first attachment pocket 126a and a second attachment pocket 126b (collectively 'attachment pockets 126') (shown e.g., in FIGS. 1A and 1B) may be defined by the portion of the fifth layer 118 and the portion of the third layer 116 that overlap. In some embodiments, additional attachment pockets 126 may be defined by the portion of the fifth layer 118 and the portion of the fourth layer 135 that overlap. The attachment pockets 126 are discussed in more detail below in relation to FIG. 4. A locking device pocket 128 (shown e.g., in FIGS. 1A and 1B) may be defined by the portion of the fifth layer 118 and the portion of the third layer 116 that overlap.

The vehicle pad 102 may include a first webbing strap 108a and a second webbing strap 108b (collectively 'webbing straps 108') (shown e.g., in FIGS. 1A and 1B). The vehicle pad 102 may also include a first attachment device 125a and a second attachment device 125b (collectively 'attachment devices 125'). The webbing straps 108 may be configured to attach the vehicle pad 102 to the tailgate.

A first end of the webbing straps 108 may be attached to the vehicle pad 102 at a first point of the vehicle pad 102. A second end 129a and 129b (collectively 'first end 129') of the webbing straps 108 may be configured to pass through a hinge gap 127 (shown e.g., in FIGS. 1A and 1B) and attach to a second point of the vehicle pad 102. The second end 129 of the webbing straps 108 may attach to the second point of the vehicle pad 102 using the attachment devices 125. For example, the second end 129a of the first webbing strap 108a may be configured to pass through the hinge gap 127 and attach to the first attachment device 125a. The first point may be adjacent to a third side 131 of the tailgate. The second point may be adjacent to a first side 133 of the tailgate.

In some embodiments, the webbing straps 108 may include a nylon webbing material or any other appropriate material. In some embodiments, the webbing straps 108 may include a width between two millimeters (mm) and thirty mm.

The attachment devices 125 may be configured to maintain tension on the webbing straps 108 when the vehicle pad 102 is attached to the tailgate. The attachment devices 125 may be located in the attachment pockets 126. For example, the first attachment device 125a may be located in the first attachment pocket 126a. In some embodiments, the attachment devices 125 may include tension locks. The attachment devices 125 may be at least partially concealed by the attachment pockets 126 so as to reduce and/or prevent damage caused by the attachment device 125 to the payloads 130 when secured to the vehicle pad 102.

The vehicle pad 102 may include a locking piece 112 (shown e.g., in FIGS. 1A and 1B) and a first lock strap 110 (shown e.g., in FIGS. 1A and 1B). The locking piece 112 and the first lock strap 110 may be configured to lock the vehicle pad 102 to the tailgate. A first end of the first lock strap 110 may be attached to the vehicle pad 102 at a third point of the vehicle pad 102. A second end of the first lock strap 110 may be configured to pass through the hinge gap 127 and attach to the vehicle pad 102 at the third point using the locking piece 112. The third point of the vehicle pad 102 may be adjacent to the first side 133 of the tailgate. The first lock strap 110 is discussed in more detail below in relation FIG. 5.

In some embodiments, the first lock strap 110 may include a nylon webbing material, a steel cable wrapped in a nylon material, or any other appropriate material. In some embodiments, the first lock strap 110 may include a width between two mm and thirty mm.

The locking piece 112 may be located in the locking device pocket 128. A portion of the locking piece 112 may be attached to a fourth point of the vehicle pad 102 within the locking device pocket 128. The portion of the locking piece 112 attached at the fourth point may be concealed by the locking device pocket 128 so as to reduce and/or prevent access to the portion of the locking piece attached at the fourth point. The locking piece 112 may be at least partially concealed by the locking device pocket 128 so as to reduce and/or prevent damage caused by the locking piece 112 to the payloads 130 when secured to the vehicle pad 102. The fourth point may be adjacent to the first side 133 of the tailgate.

The first lock strap 110 may include a first end (not shown) and a second end 593. The second end 593 may be configured to pass through the hinge gap 127 and attach to the locking piece 112. In some embodiments, the second end 593 may include a second end loop 595.

The locking piece 112 may include a combination portion 581 configured to transition between a locked state and an unlocked state. In the unlocked state, the combination portion 581 may be configured to move to create an opening and expose an end of the locking piece 112. The second end loop 595 may be configured to slide over the exposed end of the locking piece 112. In the locked state, the combination portion 581 may connect and lock to the end of the locking piece 112 to form a closed loop. To change the combination portion 581 from the locked state to the unlocked state, the combination portion 581 may be unlocked. The combination portion 581 may be unlocked by a user entering a particular combination of digits, letters, and/or symbols; using a key; and/or any other appropriate means for locking and unlocking the combination portion 581.

When the second end loop 595 is slid over the exposed end of the locking piece 112 in the unlocked state and the combination portion 581 is subsequently locked, the first lock strap 110 may be attached to the vehicle pad 102 in such a manner that the vehicle pad 102 cannot be detached from the tailgate until the combination portion 581 is unlocked and the second end loop 595 is removed from the locking piece 112. In some embodiments, the locking piece 112 may include a locking carabiner. In other embodiments, the locking piece 112 may include any other appropriate locking device.

The vehicle pad 102 may include a first bump-out strap 122a, a second bump-out strap 122b, a third bump-out strap 122c, a fourth bump-out strap 122d, a fifth bump-out strap 122e, and a sixth bump-out strap 122f (collectively 'bump-out straps 122'). The vehicle pad 102 may also include a first payload attachment device 124a and a second payload attachment device 124b (collectively 'payload attachment devices 124'). The payload attachment devices 124 may include a loop created by bar-tacking a first end and a second end to the edging 114.

The vehicle pad 102 may include a payload strap 104 (shown e.g., in FIGS. 1A and 1B). The payload strap 104 may be employed to secure the payloads 130 the vehicle pad 102. The payloads 130 illustrated in FIG. 1B are provided for example purposes only and it will be understood that the payloads 130 may include any appropriate item that can be secured to the vehicle pad 102 and transported by a vehicle. For example, the payload strap 104 may include a width between ten mm and fifty mm. Additionally, the payload strap 104 may include a length of, for example, substantially two hundred cm and substantially three hundred cm.

The bump-out straps 122 may be attached to the fifth layer 118 of the vehicle pad 102 using one or more stitches. Each stitch on the bump-out straps 122 may be attached to the fifth layer 118 so as to be adjacent to a third side 131 of the tailgate when the vehicle pad 102 is attached to the tailgate. The bump-out straps 122 may be located at different positions along the fifth layer 118. Each stitch on the bump-out straps 122 may be positioned a particular distance apart from each other. Positioning each stitch the particular distance apart from each other may form multiple openings between the fifth layer 118 and the bump-out straps 122. The portions of the bump-out straps 122 that define the openings between the fifth layer 118 and the bump-out straps 122 may be configured to move away from the fifth layer 118 to create space between the bump-out straps 122 and the fifth layer 118. In some embodiments, the space between the bump-out straps 122 and the fifth layer 118 may include a height between fifty mm and one hundred mm. In some embodiments, the bump-out straps 122 may include a width between twenty mm and seventy mm.

The payload strap 104 may be configured to pass through the space between the bump-out straps 122 and the fifth layer 118. The payload strap 104 may attach to the vehicle pad 102 using the payload attachment devices 124. The payload strap 104 may be configured to pass through one or more of the spaces between the bump-out straps 122 and the fifth layer 118 to adjust a size and/or position of a payload loop 132. For example, as illustrated in FIG. 1B, the payload strap 104 may create a first payload loop 132a and a second payload loop 132b.

In some embodiments, the payload strap 104 may be configured to pass through each space between the bump-out straps 122 and the fifth layer 118, a portion of the spaces between the bump-out straps 122 and the fifth layer 118, or none of the spaces between the bump-out straps 122 and the fifth layer 118. For example, the payload strap 104 may pass through the space between the first bump-out strap 122a and the fifth layer 118, the space between the second bump-out strap 122b and the fifth layer 118, the space between the fifth bump-out strap 122e and the fifth layer 118, and the space between the sixth bump-out strap 122f and the fifth layer 118 (shown e.g., in FIG. 1A). As another example, the payload strap 104 may pass through the space between the first bump-out strap 122a and the fifth layer 118, the space between the third bump-out strap 122c and the fifth layer 118, the space between fourth bump-out strap 122d and the fifth layer 118, and the space between the sixth bump-out strap 122f and the fifth layer 118 (shown e.g., in FIG. 1B).

The payload attachment devices 124 may configured to maintain tension of the payload strap 104 when the payload strap 104 is securing one or more payloads 130 to the vehicle pad 102. In some embodiments, the payload attachment devices 124 may include tension locks. In some embodiments, the payload attachment devices 124 may include an alutica tilt head tension lock and/or an alutica bottle opener tension hook.

The vehicle pad 102 may include a molle webbing device 115 (shown e.g., in FIG. 1C). The molle webbing device 115 may be configured to attach one or more modular accessories 134 to the vehicle pad 102. The modular accessories 134 illustrated in FIG. 1C are provided for example purposes only, and it will be understood that the modular accessories 134 may include any appropriate item that can be secured to the vehicle pad 102 via the molle webbing device 115. The molle webbing device 115 may include a first molle strap 370a and a second molle strap 370b. The molle webbing device 115 is discussed in more detail below in relation FIGS. 6-8.

In some embodiments, the vehicle pad 102 may include an edging 114. The edging 114 may bind the vehicle pad 102 along a perimeter of the vehicle pad 102. In some embodiments, the vehicle pad 102 may include multiple layers of materials and the edging 114 may bind the various layers along the perimeter of the vehicle pad 102. The various layers of the vehicle pad are discussed in more detail below in relation to FIG. 2.

In some embodiments, the vehicle pad 102 may define an access hole 106 (shown e.g., in FIGS. 1A and 1B). The access hole 106 may be positioned and configured so as to permit access to a handle of the tailgate. Providing access to the handle of the tailgate may permit the tailgate to be moved between the open position and the closed position without having to remove the vehicle pad 102 or reach between the vehicle pad 102 and the tailgate. Additionally, providing access to the handle of the tailgate may permit cameras or other devices and/or accessories located on or in the handle of the tailgate to function without hindrance caused by the vehicle pad 102.

Figure 2:
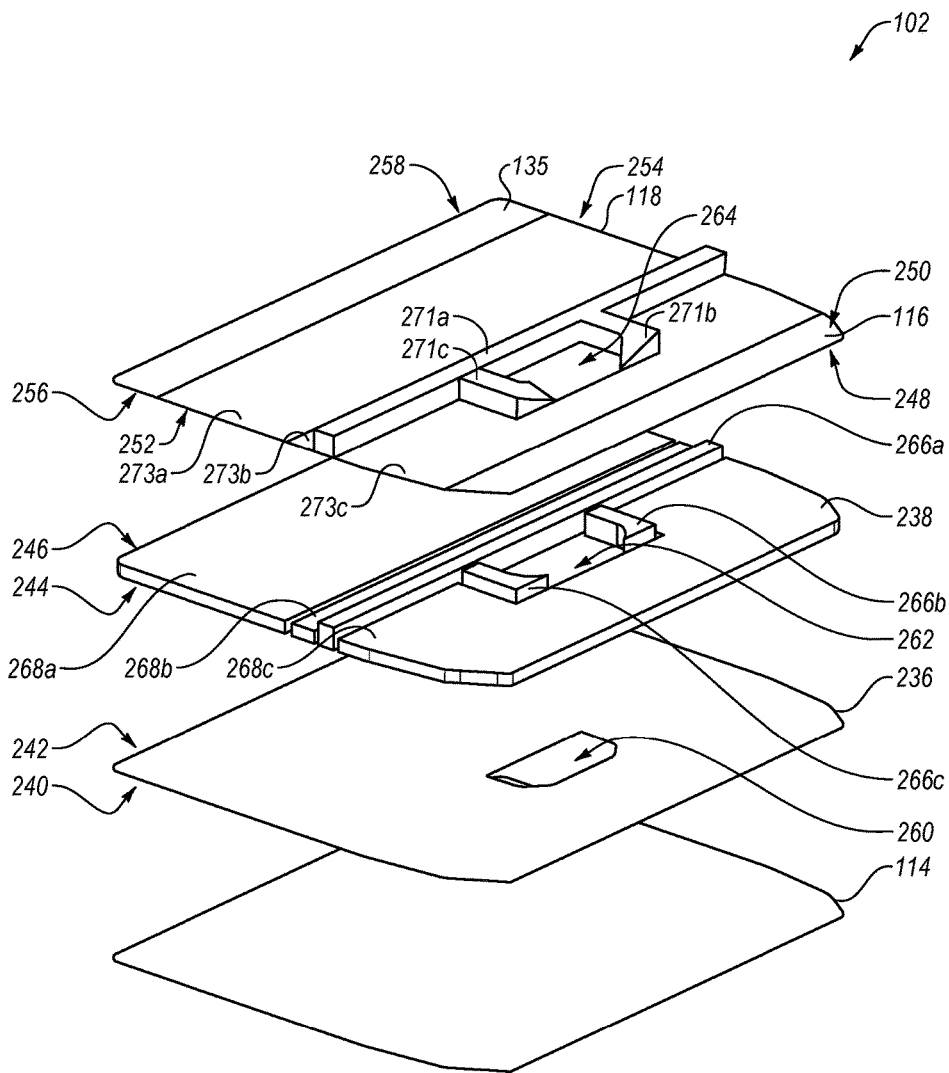
FIG. 2 illustrates an exploded perspective view of the modular vehicle pad of FIGS. 1A-1C.

FIG. 2 illustrates an exploded perspective view of the vehicle pad 102 of FIGS. 1A-1C, arranged in accordance with at least one embodiment described herein. The vehicle pad 102 may include a first layer 236, a second layer 238, a third layer 116, a fourth layer 135, a fifth layer 118, and an edging 114. The third layer 116 may be the same or similar to the third layer 116 discussed above in relation to FIGS. 1A-1C. The fourth layer 135 may be the same or similar to the fourth layer 135 discussed above in relation to FIGS. 1A-1C. The fifth layer 118 may be the same or similar to the fifth layer 118 discussed above in relation to FIGS. 1A-1C. The edging 114 may be the same or similar to the edging 114 discussed above in relation to FIGS. 1A-1C.

The first layer 236 may include a first surface 240 and a second surface 242. The first layer 236 may define a first layer access hole 260. In some embodiments, the first layer 236 may include a polyester felt material or any other appropriate material.

The second layer 238 may include a third surface 244 and a fourth surface 246. The second layer 238 may define a second layer access hole 262. A portion of the third surface 244 may be in contact with the second surface 242. In some embodiments, the entire third surface 244 may be in contact with the second surface 242. In some embodiments, the second layer 238 may include a foam material or any other appropriate material.

The second layer 238 may include a first raised portion 266a, a second raised portion 266b, and a third raised portion 266c (collectively 'raised portions 266'). The second layer 238 may also include a first non-raised portion 268a, a second non-raised portion 268b, and a third non-raised portion 268c (collectively 'non-raised portions 268'). The raised portions 266 may include a height that is greater than the height of the non-raised portions 268. For example, the height of the raised portions 266 may be between twenty five mm and one hundred mm. For example, the height of the non-raised portions 268 may be between ten mm and seventy five mm.

In some embodiments, the raised portions 266 may reduce and/or eliminate damage to the tailgate caused by payloads that are secured to the vehicle pad 102. The raised portions 266 may maintain a larger distance between the tailgate and the payloads that secured to the vehicle pad 102. In some embodiments, the raised portions 266 (e.g., the first raised portion 266a) may be positioned so as to be adjacent to a third side 131 and/or a first side 133 of the tailgate when the vehicle pad 102 is attached to the tailgate. In these and other embodiments, the raised portions 266 (e.g., the second raised portion 266b and the third raised portion 266c) may define a portion of the second layer access hole 262 and may reduce and/or prevent payloads from striking the handle or any portion of the tailgate exposed by the access hole (e.g., the access hole 106 of FIGS. 1A-1C). The raised portions 266 and the non-raised portions 268 may be die-cut to shape.

The third layer 116 may include a fifth surface 248 and a sixth surface 250. A portion of the fifth surface 248 may be in contact with the fourth surface 246. In some embodiments, the entire fifth surface 248 may be in contact with the fourth surface 246. The third layer 116 may include a laminated nylon material or any other appropriate material. The fourth layer 135 may include a ninth surface 256 and a tenth surface 258. A portion of the ninth surface 256 may be in contact with the fourth surface 246. In some embodiments, the entire ninth surface 256 may be in contact with the fourth surface 246. The fourth layer 135 may include a laminated nylon material or any other appropriate material.

The fifth layer 118 may include a seventh surface 252 and an eighth surface 254. The fifth layer 118 may define a fifth layer access hole 264. A first portion of the seventh surface 252 may be in contact with the fourth surface 246. A second portion of the seventh surface 252 may be in contact with a portion of the sixth surface 250. A third portion of the seventh surface 252 may be in contact with a portion of the tenth surface 258. One or more attachment pockets (e.g., the attachment pockets 126 of FIGS. 1A-1C) may be defined by the second portion of the seventh surface 252 and the portion of the sixth surface 250 and/or the third portion of the seventh surface 252 and the portion of the tenth surface 258. A locking device pocket (e.g., the locking device pocket 128 of FIGS. 1A-1C) may be defined by the second portion of the seventh surface 252 and the portion of the sixth surface 250. The fifth layer 118 may include a laminated nylon material or any other appropriate material.

The fifth layer 118 may include a fifth layer first raised portion 271a, a fifth layer second raised portion 271b, and a fifth layer third raised portion 271c (collectively 'fifth layer raised portions 271'). The fifth layer raised portions 271 may correspond to the raised portions 266. For example, the fifth layer first raised portion 271a may correspond to the first raised portion 266a, the fifth layer second raised portion 271b may correspond to the second raised portion 266b, and the fifth layer third raised portion 271c may correspond to the third raised portion 266c. In some embodiments, the fifth layer first raised portion 271a may be in contact with the first raised portion 266a, the fifth layer second raised portion 271b may be in contact with the second raised portion 266b, and the fifth layer third raised portion 271c may be in contact with the third raised portion 266c.

The fifth layer 118 may include a fifth layer first non-raised portion 273a, a fifth layer second non-raised portion 273b, and a fifth layer third non-raised portion 273c (collectively 'fifth layer non-raised portions 273'). The fifth layer non-raised portions 273 may correspond to the non-raised portions 268. For example, the fifth layer first non-raised portion 273a may correspond to the first non-raised portion 268a, the fifth layer second non-raised portion 273b may correspond to the second non-raised portion 268b, and the fifth layer third non-raised portion 273c may correspond to the third non-raised portion 268c. In some embodiments, the fifth layer first non-raised portion 273a may be in contact with the first non-raised portion 268a, the fifth layer second non-raised portion 273b may be in contact with the second non-raised portion 268b, and the fifth layer third non-raised portion 273c may be in contact with the third non-raised portion 268c The edging 114 may bind the first layer 236, the second layer 238, the third layer 116, the fourth layer 135, and the fifth layer 118 along a perimeter of the vehicle pad 102. The edging 114 may bind the various layers to cause the various surfaces to contact other surfaces.

In some embodiments, the first layer access hole 260, the second layer access hole 262, and the fifth layer access hole 264 may form the access hole 106 discussed above in relation to FIGS. 1A-1C. For example, the first layer access hole 260, the second layer access hole 262, and the fifth layer access hole 264 may be positioned and configured so as to permit access to a handle of a tailgate.

Figure 3A:
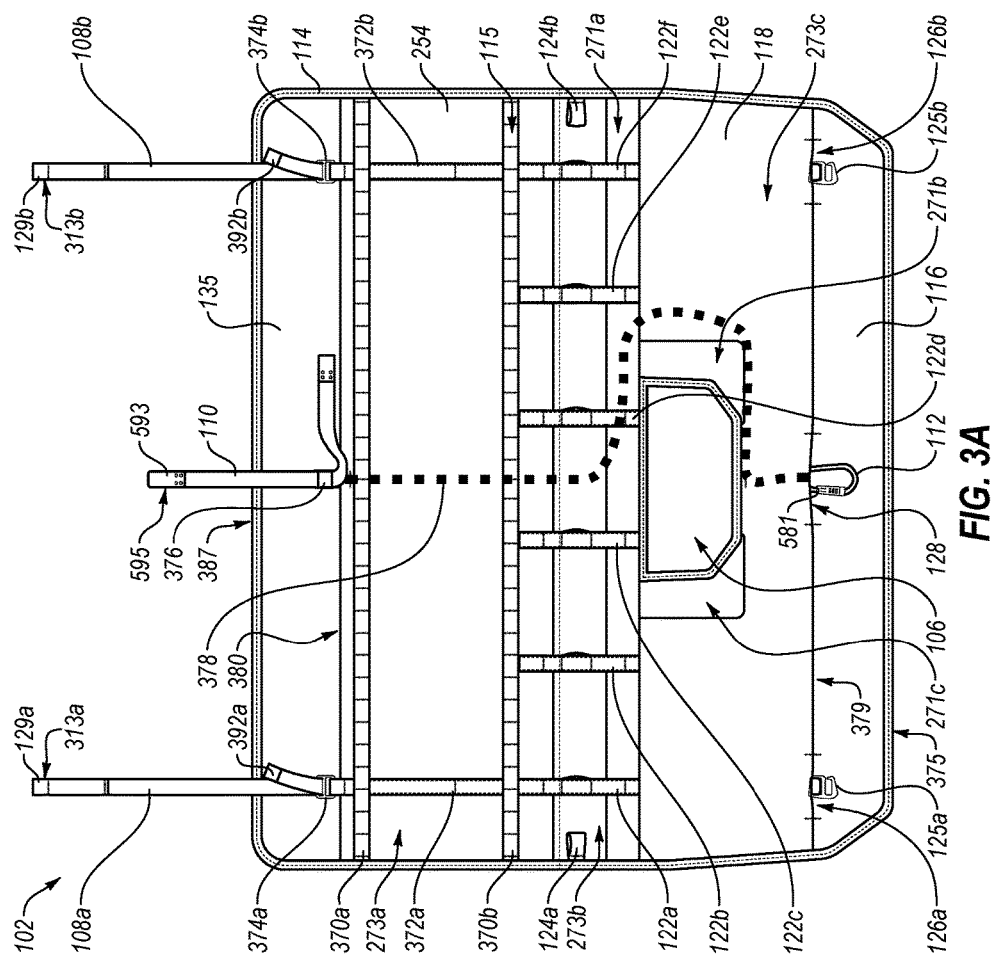
FIG. 3A illustrates an orthogonal view of the modular vehicle pad of FIGS. 1A-1C.

FIGS. 3A and 3B illustrate orthogonal views of the vehicle pad 102 of FIGS. 1A-1C, arranged in accordance with at least one embodiment described herein. FIG. 3A illustrates a front view of the vehicle pad 102. FIG. 3B illustrates a back view of the vehicle pad 102.

The vehicle pad 102 may include a fifth layer 118, a third layer 116, and a fourth layer 135. The fifth layer 118 may be the same or similar to the fifth layer 118 discussed above in relation to FIGS. 1A-1C. The third layer 116 may be the same or similar to the third layer 116 discussed above in relation to FIGS. 1A-1C. The fourth layer 135 may be the same or similar to the fourth layer 135 discussed above in relation to FIGS. 1A-1C. The vehicle pad 102 may define an access hole 106. The access hole 106 may be the same or similar to the access hole 106 discussed above in relation to FIGS. 1A-1C.

The vehicle pad 102 may include a first layer 236 (shown e.g., in FIG. 3B). The first layer 236 may be the same or similar to the first layer 236 discussed above in relation to FIG. 2. A portion of the first layer 236 may be in contact with a tailgate when the vehicle pad 102 is attached to the tailgate.

Multiple attachment pockets 126 may be defined by a portion of the fifth layer 118 and a portion of the third layer 116 and/or a portion of the fifth layer 118 and a portion of the fourth layer 135 that overlap. The attachment pockets 126 may be the same or similar to the attachment pockets 126 discussed above in relation to FIGS. 1A-1C. A locking device pocket 128 may be defined the portion of the fifth layer 118 and the portion of the third layer 116 that overlap. The locking device pocket 128 may be the same or similar to the locking device pocket 128 discussed above in relation to FIGS. 1A-1C.

The vehicle pad 102 may include webbing straps 108, attachment devices 125, a locking piece 112, a first lock strap 110, multiple bump-out straps 122, multiple payload attachment devices 124, and an edging 114. The webbing straps 108 may include a first end 392 and a second end 129. The webbing straps 108 may be the same or similar to the webbing straps 108 discussed above in relation to FIGS. 1A-1C. The attachment devices 125 may be the same or similar to the attachment devices 125 discussed above in relation to FIGS. 1A-1C. The locking piece 112 may include a combination portion 581. The locking piece 112 may be the same or similar to the locking piece 112 discussed above in relation to FIGS. 1A-1C. The first lock strap 110 may include a second end 593 and a second end loop 595. The first lock strap 110 may be the same or similar to the first lock strap 110 discussed above in relation to FIGS. 1A-1C. The bump-out straps 122 may be the same or similar to the bump-out straps 122 discussed above in relation to FIGS. 1A-1C. The payload attachment devices 124 may be the same or similar to the payload attachment devices 124 discussed above in relation to FIGS. 1A-1C. The edging 114 may be the same or similar to the edging 114 discussed above in relation to FIGS. 1A-1C.

The vehicle pad 102 may include multiple fifth layer raised portions 271 and multiple fifth layer non-raised portions 273. The fifth layer raised portions 271 may be the same or similar to the fifth layer raised portions 271 discussed above in relation to FIG. 2. The fifth layer non-raised portions 273 may be the same or similar to the fifth layer non-raised portions 273 discussed above in relation to FIG. 2. The fifth layer raised portions 271 may partially surround the access hole 106. For example, the fifth layer raised portions 271 may surround the access hole 106 on two sides, three sides, or one side of the access hole 106. In some embodiments, the fifth layer raised portions 271 may surround the access hole 106 on all sides.

The vehicle pad 102 may include a second lock strap 378. The second lock strap 378 may be attached to the locking piece 112. The second lock strap 378 may extend from the locking piece 112 and attach to a locking attachment device 376 adjacent to a second edge 380 of the fifth layer 118. The second lock strap 378 may be located between the second layer 238 and the fifth layer 118 to prevent access to the second lock strap 378. A position of the second lock strap at a second edge of the fifth layer 118 may be maintained using a bar tack or any other appropriate method.

The vehicle pad 102 may include a molle webbing device 115. The molle webbing device 115 may include a first molle strap 370a and a second molle strap 370b (collectively 'molle straps 370'). Although, the molle webbing device 115 as illustrated includes two molle straps 370, it is understood that the molle webbing device 115 may include more than two straps or less than two straps. The molle webbing device 115 may be the same or similar to the molle webbing device 115 discussed above in relation to FIGS. 1A-1C.

The molle straps 370 may be attached to an eighth surface 254 of the fifth layer 118. The eighth surface 254 may be the same or similar to the eighth surface 254 discussed above in relation to FIG. 2. In some embodiments, the first molle strap 370a may be positioned parallel relative to the second molle strap 370b and/or the second edge 380. In other embodiments, the first molle strap 370a may be positioned at an angle (e.g., not parallel) relative to the second molle strap 370b and/or the second edge 380.

The molle straps 370 may be attached to the eighth surface 254 using multiple stitches along a length of the molle straps 370. Each stitch along the length of the molle straps 370 may be positioned a particular distance apart from each other. In some embodiments, each stitch along the length of the molle straps may be positioned between substantially one cm and substantially twenty cm apart from each other. Positioning each stitch the particular distance apart from each other may form multiple openings between the eighth surface 254 and the molle straps 370. The portions of the molle straps 370 between the various stitches may be configured to move away from the eighth surface 254 to create space (e.g., webbing loops) between the molle straps 370 and the eighth surface 254. Each webbing loop may be configured to receive a molle attachment device to secure a modular accessory to the vehicle pad 102. The molle attachment devices are discussed in more detail below in relation to FIGS. 6 and 7. The molle straps 370 may be positioned so as to be adjacent to a third side 131 of the tailgate when the vehicle pad 102 is attached to the tailgate.

The vehicle pad 102 may include a first secondary attachment device 374a and a second secondary attachment device 374b (collectively 'secondary attachment devices 374'). The vehicle pad 102 may also include a first attachment strap 372a and a second attachment strap 372b (collectively 'attachment straps 372'). The secondary attachment devices 374 may be configured to attach to the webbing straps 108. In some embodiments, the secondary attachment devices 374 may be configured to maintain tension on the webbing straps 108 when the vehicle pad is attached to the tailgate. The secondary attachment devices 374 may also be attached to the attachment straps 372.

The attachment straps 372 may be attached to the eighth surface 254. In some embodiments, the first attachment strap 372a may be positioned parallel relative to the second attachment strap 372b and perpendicular relative to the second edge 380. In other embodiments, the first attachment strap 372a may be positioned at an angle (e.g., not parallel) relative to the second attachment strap 372b and/or at an angle not perpendicular relative to the second edge 380.

The locking attachment device 376 may be configured to attach to the first lock strap 110. In some embodiments, the locking attachment device 376 may be configured to maintain tension on the first lock strap 110 when the vehicle pad 102 is locked to the tailgate. The locking attachment device 376 is discussed in more detail below in relation to FIG. 5.

The first end 392 of the webbing straps 108 may be configured to pass through an opening defined by the secondary attachment devices 374 to attach to the webbing straps 108 to the secondary attachment devices 374. The second end 129 may be configured to pass through a hinge gap (e.g., the hinge gap 127 of FIGS. 1A-1C). In some embodiments, the second end 129 may include a loop configured to attach to the attachment devices 125. In these and other embodiments, the attachment devices 125 may include a hook configured to receive the loop on the second end 129. When attached to the tailgate, the second end 129 may be used to apply tension on the webbing straps 108 to secure the vehicle pad 102 to the tailgate.

The vehicle pad 102 may include a third edge 375 and a fourth edge 387. The fifth layer 118 may include a first edge 379. In some embodiments, the access hole 106 may be defined so as to include a width between substantially ten centimeters (cm) and substantially fifty cm. For example, the access hole 106 may include a first width of substantially thirty five cm and may taper to a second width of substantially nineteen cm. In these and other embodiments, the access hole 106 may also be defined so as to include a height between substantially ten cm and substantially thirty cm. In other embodiments, the access hole may include a substantially uniform width. Additionally, the access hole 106 may be located between substantially zero cm and substantially seventy cm from the first edge 379.

The molle straps 370 may be located between substantially zero cm and substantially seventy cm from the second edge 380. The first lock strap 110 may include a length between substantially twenty five inches and substantially fifty inches. The webbing straps 108 may be positioned between substantially zero cm and substantially thirty cm away from side edges of the vehicle pad 102.

An overall length of the fifth layer 118 (e.g., a distance between the first edge 379 and the second edge 380) may be between substantially seventy cm and substantially one hundred cm. A distance between the third edge 375 and the first edge 379 may be between substantially five cm and substantially thirty cm. A distance between the fourth edge 387 and the second edge 380 may be between substantially five cm and substantially thirty cm. An overall length of the vehicle pad 102 (e.g., a distance between the third edge 375 and the fourth edge 387) may be between substantially ninety cm and substantially one hundred fifty cm.

The portion of the vehicle pad 102 that may be adjacent to the third side 131 may be between substantially twenty cm and substantially sixty five cm from the first edge 379. The portion of the vehicle pad that may be adjacent to the first side 133 may be between substantially zero cm and substantially seventy cm from the third edge 375. The portion of the vehicle pad that may be adjacent to the second side 113 may be between substantially zero and substantially seventy cm from the fourth edge 387.

The side edges of the vehicle pad 102 and the fourth edge 387 of the vehicle pad 102 may form multiple corners that curve at a radius between substantially zero cm and substantially ten cm. The side edges of the vehicle pad 102 may include multiple taper sections between the fourth edge 387 and the third edge 375. The fourth edge 387 may include a width between substantially one hundred cm and substantially one hundred fifty cm and the width of the vehicle pad 102 may taper to a width between substantially eighty cm and substantially one hundred thirty cm at the third edge 375. In some embodiments, the vehicle pad 102 may include a substantially uniform width between substantially one hundred cm and substantially one hundred fifty cm.

In some embodiments, the lock device (e.g., the first lock strap 110, the locking piece 112, and the second lock strap 378 may be positioned to be substantially centered relative to the width of the vehicle pad 102. In other embodiments, the lock device (e.g., the first lock strap 110, the locking piece 112, and the second lock strap 378 may be positioned to not be substantially centered relative to the width of the vehicle pad 102.

FIGS. 4A and 4B illustrate an example attachment pocket 126 of the vehicle pad 102 of FIGS. 1A-1C, arranged in accordance with at least one embodiment disclosed herein. FIG. 4B illustrates a sectional view of the attachment pocket 126 of the vehicle pad 102.

The attachment pocket 126 may be defined by a third layer 116 and a fifth layer 118 of the vehicle pad 102. The third layer 116 may be the same or similar to the third layer 116 discussed above in relation to FIGS. 1A-1C. The fifth layer 118 may be the same or similar to the fifth layer 118 discussed above in relation to FIGS. 1A-1C.

A portion of the fifth layer 118 may overlap a portion of the third layer 116 to define an overlap section 482. The attachment pocket 126 may be formed by a first pocket stitch 486a and a second pocket stitch 486b (collectively 'pocket stitches 486'). The pocket stitches 486 may be positioned a particular distance apart from each other along a width of the fifth layer 118 and the third layer 116. The pocket stitches 486 may cause a portion of the fifth layer 118 located between the pocket stitches 486 to move away from the third layer 116 and create the attachment pocket 126.

In some embodiments, the portion of the fifth layer 118 located between the pocket stitches 486 may include a greater width than the particular distance between the pocket stitches 486 and/or a width of the portion of the third layer 116 located between the pocket stitches 486. The greater width of the portion of the fifth layer 118 located between the pocket stitches 486 may cause the portion of the fifth layer 118 between the pocket stitches 486 to bulge and cause a seventh surface 252 of the fifth layer 118 to move away from a fifth surface 248 of the third layer 116 between the pocket stitches 486.

An attachment device strap 477 may be attached to the vehicle pad 102 between the third layer 116 and the fifth layer 118 by a strap stitch 484. The attachment device strap 477 may also be attached to an attachment device 125. In some embodiments, the attachment device strap 477 and the attachment device 125 may be located inside the attachment pocket 126. In other embodiments, a portion of or the entire attachment device 125 and/or a portion of the attachment device strap 477 may extend beyond the overlap section 482. The attachment device 125 may be the same or similar to the attachment devices 125 discussed above in relation to FIGS. 1A-1C.

Figure 5:
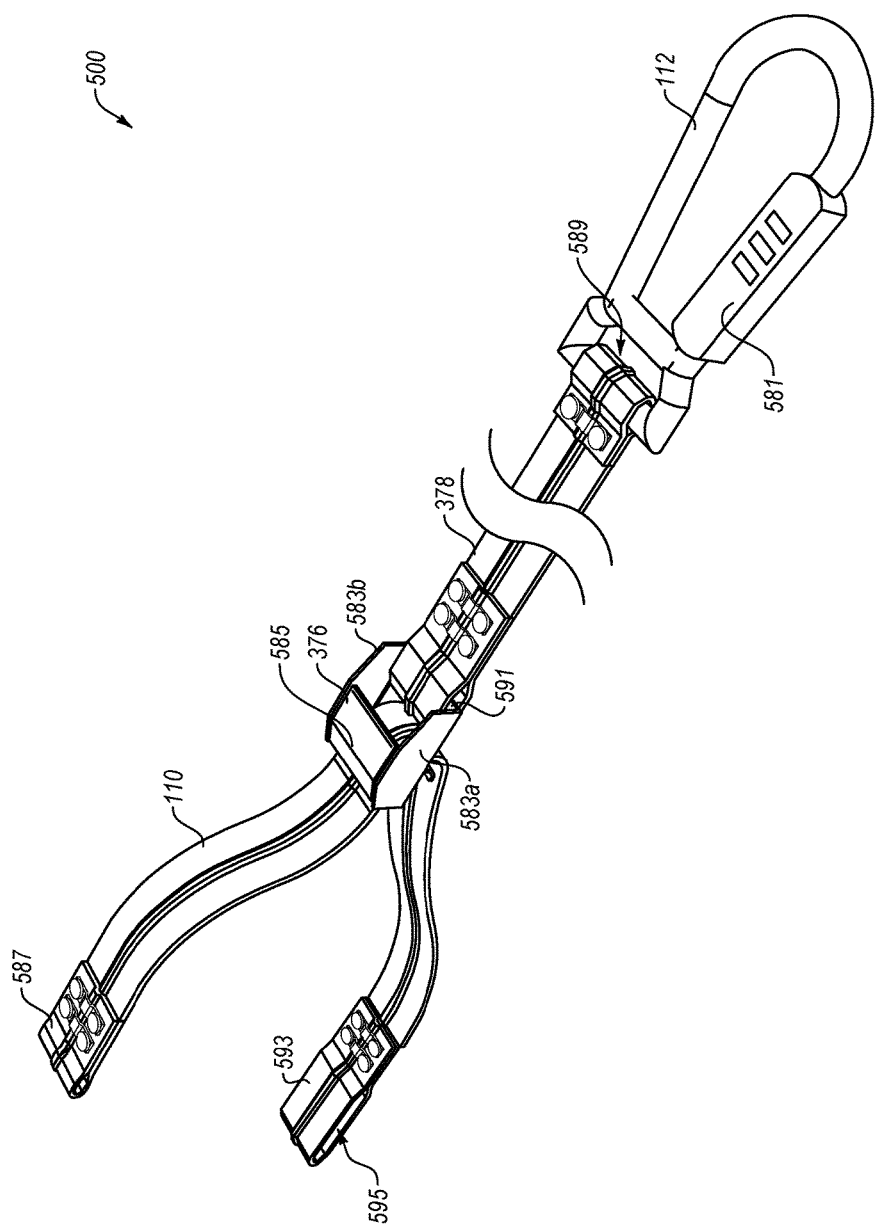
FIG. 5 illustrates a perspective view of a locking device that may be implemented with the modular vehicle pad of FIGS. 1A-1C.

FIG. 5 illustrates a perspective view of a locking device 500 that may be implemented with the vehicle pad 102 of FIGS. 1A-1C, arranged in accordance with at least one embodiment disclosed herein. The locking device 500 may include a locking piece 112, a locking attachment device 376, a first lock strap 110, and a second lock strap 378. The locking piece 112 may be the same or similar to the locking piece 112 discussed above in relation to FIGS. 1A-1C. The locking attachment device 376 may be the same or similar to the locking attachment device 376 discussed above in relation to FIG. 3A. The first lock strap 110 may be the same or similar to the first lock strap 110 discussed above in relation to FIGS. 1A-1C. The second lock strap 378 may be the same or similar to the second lock strap 378 discussed above in relation to FIG. 3A.

The locking piece 112 may include a combination portion 581. The combination portion 581 may be configured to transition between a locked state and an unlocked state. In the unlocked state, the combination portion 581 may be configured to move to create an opening and expose an end of the locking piece 112. A second end loop 595 may be configured to slide over the exposed end of the locking piece 112. In the locked state, the combination portion 581 may connect and lock to the end of the locking piece 112 to form a closed loop. To change the combination portion 581 from the locked state to the unlocked state, the combination portion 581 may be unlocked. The combination portion 581 may be unlocked by a user entering a particular combination of digits, letters, and/or symbols; using a key; and/or any other appropriate means for locking and unlocking the combination portion 581.

The first lock strap 110 may include a first end 587 and a second end 593. The second end 593 may be configured to pass through a hinge gap (e.g., hinge gap 127 of FIGS. 1A-1C) and attach to the locking piece 112. In some embodiments, the second end 593 may include the second end loop 595. The second end loop 595 may be configured to slide over the exposed end of the locking piece 112 (e.g., when the combination portion 581 is in the unlocked state). The second end loop 595 may be formed by folding a portion of the first lock strap 110 back over on itself and attaching the folded portion to the first lock strap 110. The folded portion may be attached using rivets, stitching, or any other appropriate attachment method.

The locking attachment device 376 may include a push portion 585. The push portion 585 may be configured to create an opening between a second cross member of the locking attachment device 376 when the push portion 585 is in an open state. The second cross member may be attached between a first sidewall 583a and a second sidewall 583b of the locking attachment device 376. The first sidewall 583a and the second sidewall 583b may prevent the first lock strap 110 from being detached from the locking attachment device 376.

The first end 587 may be configured to pass through the opening defined by the push portion 585 and the second cross member. Passing the first end 587 through the opening a defined by the push portion 585 and the second cross member and changing the push portion 585 to a closed state may attach the first lock strap 110 to the locking attachment device 376. To prevent the first lock strap 110 from being detached from the locking attachment device 376, the push portion 585, in the closed state, may apply a clamping force on the first lock strap 110. Additionally, the first lock strap 110 may be doubled over and attached to itself at the first end 587. The first lock strap 110 may be attached to itself using rivets, stitching, or any other appropriate attachment method. Doubling over the first end 587 may cause the first end 587 to be too thick to pass through the opening defined by push portion 585 in the unlocked state and/or the locked state, and the second cross member, which may ensure that when the locking device 500 is in the locked state, the vehicle pad 102 is locked to the tailgate.

The second lock strap 378 may be attached to the locking piece 112. In some embodiments, the second lock strap 378 may be configured to pass through a locking piece loop 589 and to attach to itself. In other embodiments, the locking piece 112 may define a single loop and the second lock strap 378 may be configured to pass through the single loop and to attach to itself. The second lock strap 378 may be attached to itself using rivets, stitching, or any other appropriate attachment method.

When the second end 593 is attached to the locking piece 112 and the combination portion 581 is subsequently locked, the first lock strap 110 may be attached in such a manner that the vehicle pad 102 cannot be detached from the tailgate until the combination portion 581 is unlocked and the second end 593 is detached from the locking piece 112. In some embodiments, the locking piece 112 may include a locking carabiner. In other embodiments, the locking piece 112 may include any appropriate locking device.

The second lock strap 378 may be attached to the locking attachment device 376. The second lock strap 378 may wrap around a first cross member 591 of the locking attachment device 376 and attach to itself. The first cross member 591 may be attached between the first sidewall 583a and the second sidewall 583b of the locking attachment device 376. The first sidewall 583a and the second sidewall 583b may prevent the second lock strap 378 from being detached from the locking attachment device 376.

The second lock strap 378 may be positioned between different layers of the vehicle pad 102. For example, the second lock strap 378 may be positioned between a fifth layer and a second layer of the vehicle pad 102 as discussed above in relation to FIG. 3. The second lock strap 378 may include a length between thirty five inches and seventy inches.

In some embodiments, the second lock strap 378 may include a nylon material, a steel cable wrapped in a nylon material, or any other appropriate material. In some embodiments, the locking attachment device 376 may include a standard lockstrap buckle. The locking attachment device 376 may be powder coated, black oxidized, wrapped in rubber, or include any other appropriate coating. In some embodiments, the locking piece 112 may include a rubber coating or any other appropriate coating for reducing and/or preventing damage to the tailgate. In embodiments where the first lock strap 110 and/or the second lock strap 378 are attached using rivets or any other attachment method that may cause damage to the tailgate, the rivets and/or the other attachment method may be wrapped in a leather material, a rubber material, or any other appropriate material for reducing and/or preventing damage to the tailgate. In some embodiments, the second end loop 595 may include a length between forty mm and one hundred mm.

Figure 6A:
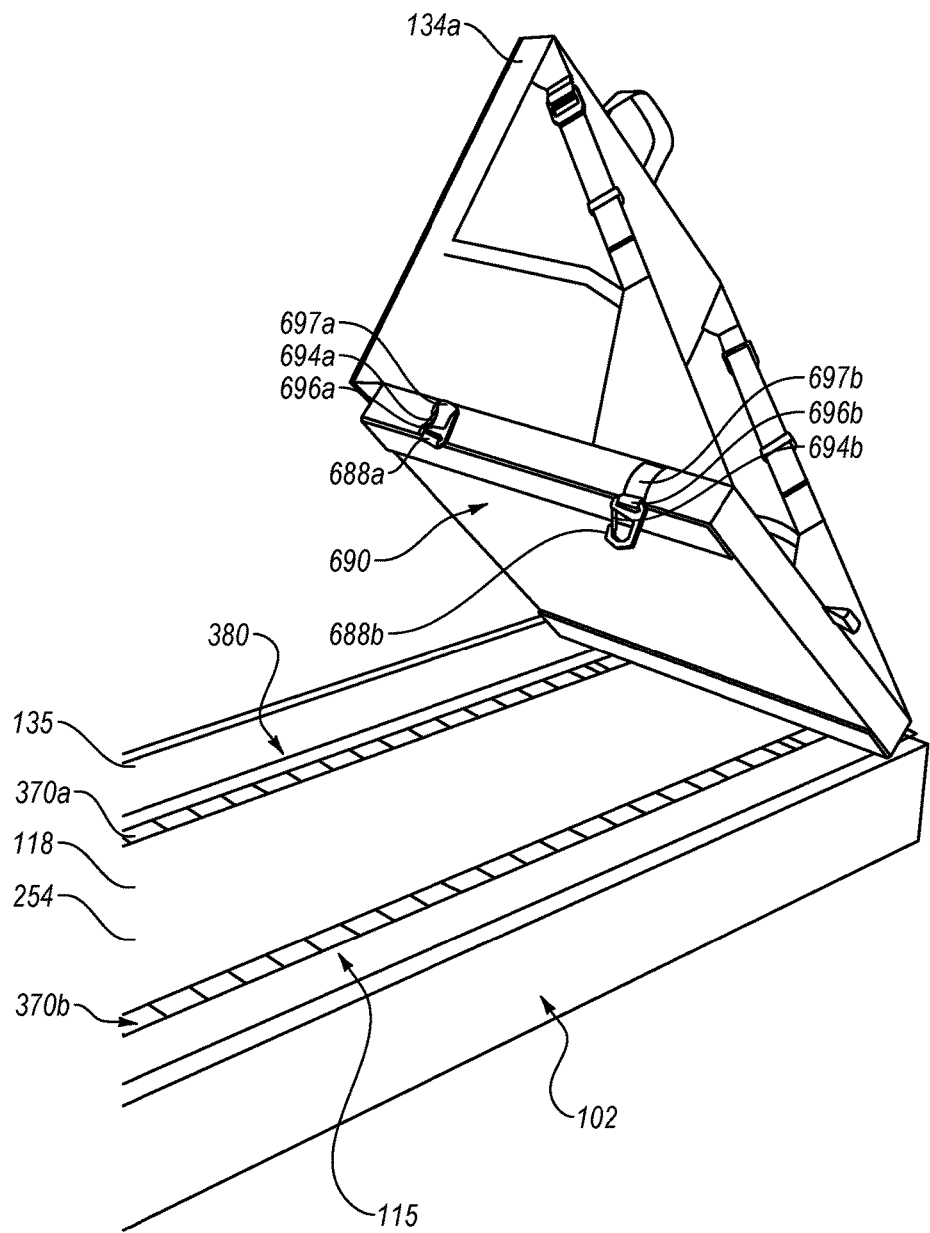
FIG. 6A illustrates an example modular accessory that may be implemented with the modular vehicle pad of FIGS. 1A-1C.
Figure 6B:
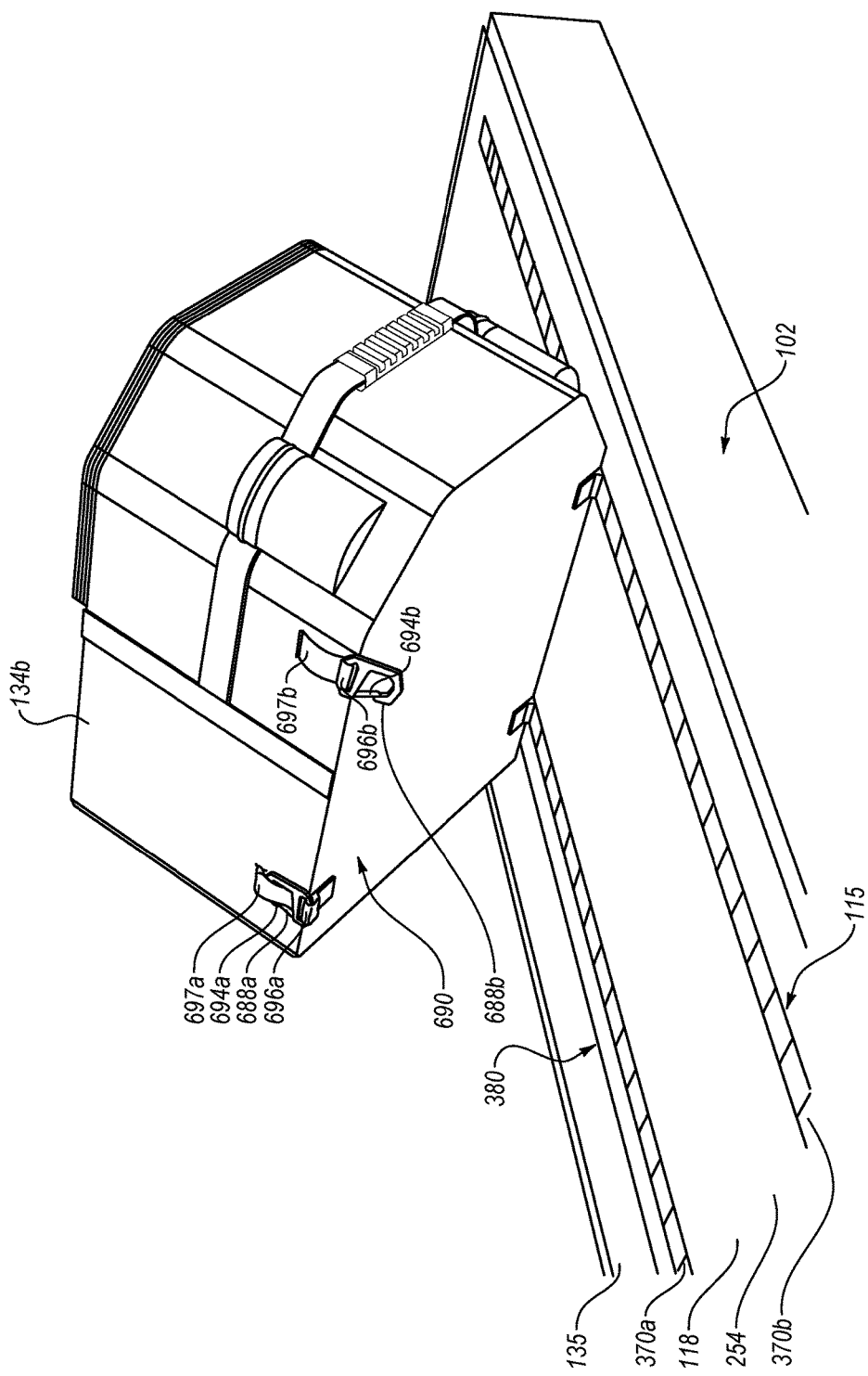
FIG. 6B illustrates another example modular accessory that may be implemented with the modular vehicle pad of FIGS. 1A-1C.

FIGS. 6A and 6B illustrate example modular accessories 134 that may implemented with the vehicle pad 102 of FIGS. 1A-1C, arranged in accordance with at least one embodiment disclosed herein. FIG. 6A illustrates a first modular accessory 134a that may be implemented with the vehicle pad 102. FIG. 6B illustrates a second modular accessory 134b that may be implemented with the vehicle pad 102.

The vehicle pad may include a fourth layer 135 and a fifth layer 118. The fourth layer 135 may be the same or similar to the fourth layer 135 discussed above in relation to FIGS. 1A-1C. The fifth layer 118 may be the same or similar to the fifth layer 118 discussed above in relation to FIGS. 1A-1C. The fifth layer 118 may include an eighth surface 254.

The modular accessories 134 may include a first molle attachment device 688a and a second molle attachment device 688b (collectively 'molle attachment devices 688'). The modular accessories 134 are illustrated as include two molle attachment devices 688, it is understood that the modular accessories 134 may include more or less than two molle attachment devices 688. The modular accessories 134 may include a first modular accessories attachment strap 696a and a second modular accessories attachment strap 696b. The molle attachment devices 688 may be attached to the modular accessories using the modular accessories attachment straps 696. A first end of the modular accessories attachment straps 696 may be attached to the modular accessories 134. A second end of the modular accessories attachment straps 696 may be configured to pass through an opening defined by the molle attachment devices 688 and to attach to the modular accessories 134.

The modular accessories 134 may also include a first molle storage strap 697a and a second molle storage strap 697b (collectively 'molle storage straps 697'). A first end of the molle storage straps 697 may be attached to the modular accessories 134. A second end of the molle storage straps 697 may be attached to the modular accessories 134 a particular distance away from the first end of the molle storage straps 697. A portion of the molle storage straps 697 between the first end and the second of the molle storage straps 697 may be configured to move away from the modular accessories to create a gap between the molle storage straps 697 and the modular accessories 134.

The molle attachment devices 688 may be configured to be positioned in a storage state or a use state. In the storage state, the molle attachment devices 688 may be attached to the molle storage straps 697. In the use state, the molle attachment device 688 may be detached from the molle storage straps 697 and configured to attach to the molle straps 370. As illustrated in FIGS. 6A and 6B, the first molle attachment device 688a is positioned in the storage state and the second molle attachment device 688b is positioned in the use state.

The vehicle pad 102 may include a molle webbing device 115. The molle webbing device 115 may include a first molle strap 370a and a second molle strap 370b (collectively 'molle straps 370'). The molle straps 370 may be attached to the eighth surface 254. The eighth surface 254 may be the same or similar to the eighth surface 254 discussed above in relation to FIG. 2. In some embodiments, the first molle strap 370a may be positioned parallel relative to the second molle strap 370b and/or a second edge 380 of the fifth layer 118. In other embodiments, the first molle strap 370a may be positioned at an angle not parallel relative to the second molle strap 370b and/or the second edge 380.

The molle straps 370 may be attached to the eighth surface 254 using multiple stitches along a length of the molle straps 370. Each stitch along the length of the molle straps 370 may be positioned a particular distance apart from each other. Positioning each stitch the particular distance apart from each other may form multiple openings between the eighth surface 254 and the molle straps 370. The portions of the molle straps 370 between the various stitches may be configured to move away from the eighth surface 254 to create space (e.g., webbing loops) between the molle straps 370 and the eighth surface 254. Each webbing loop may be configured to receive a molle attachment device 688 to secure a modular accessory to the vehicle pad 102.

In the use state, the molle attachment device 688 may be configured to attach to the vehicle pad using the molle straps 370. A first portion 694 of the molle attachment devices 688 may be configured to move to an open state to create an opening and expose an end of the molle attachment devices 688. The end of the molle attachment device 688 may be configured to pass through a webbing loop between the molle straps 370 and the eighth surface 254. The first portion 694 may be moved to a closed state to form a closed loop and cover the exposed end. In the closed state, the modular accessories 134 may be attached to the vehicle pad 102 via a portion of the molle straps 370 enclosed within the closed loop of the molle attachment device 688.

The molle webbing device 115 may be configured to attach one or more modular accessories 134 to the vehicle pad 102. The various webbing loops created between the eighth surface 254 and the molle straps 370 may be used to attach modular accessories of various widths and lengths. In some embodiments, the molle webbing device 115 may be configured to attach modular accessories 134 that include a width between, for example, substantially five cm and substantially one hundred fifty cm. In these and other embodiments, the molle webbing device 115 may be configured to attach modular accessories 134 that include a length between substantially thirty cm and substantially sixty cm.

A mounting surface 690 of the modular accessories 134 may configured to be positioned adjacent to the eighth surface 254 when the modular accessories 134 are attached to the vehicle pad 102. In some embodiments, a portion of the mounting surface 690 may be in contact with a portion of the eighth surface 254, when the modular accessories 134 are attached to the vehicle pad 102. In these and other embodiments, another portion of the mounting surface 690 may be in contact with a portion of the fourth layer 135.

The molle attachment devices 688 may include, for example, an alutica tilt head clip hook. The molle attachment devices 688 may include a width between, for example, substantially ten cm and substantially fifty cm. The molle attachment devices 688 may be powder coated, black oxidized, wrapped in rubber, or include any other appropriate coating. In these and other embodiments, the molle attachment devices 688 may be anodized. For example, the molle attachment devices may be black anodized.

Figure 7:
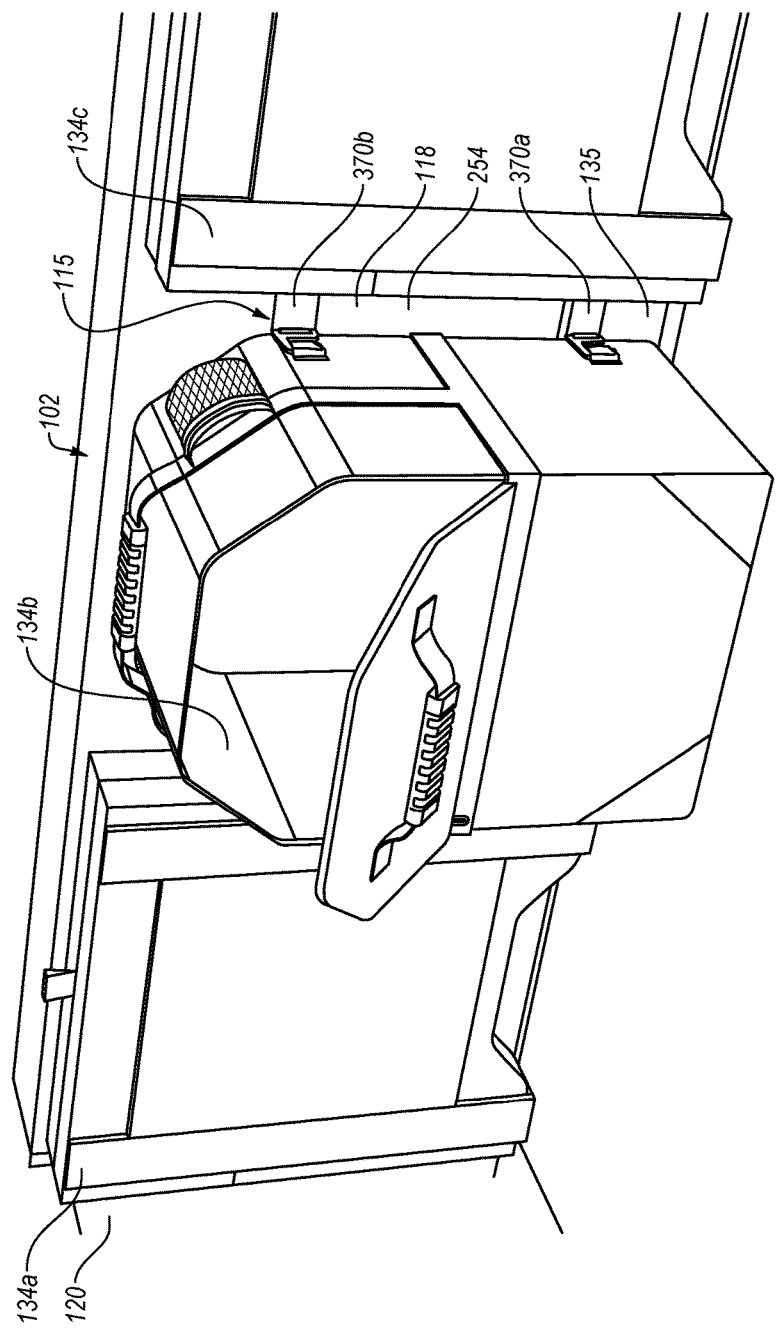
FIG. 7 illustrates the modular accessories of FIGS. 6A and 6B implemented with the modular vehicle pad of FIGS. 1A-1C, all arranged in accordance with at least one embodiment described herein.

FIG. 7 illustrates example modular accessories 134a-134c that may be implemented with the vehicle pad 102 of FIGS. 1A-1C, arranged in accordance with at least one embodiment disclosed herein. The vehicle pad 102 may be attached to a tailgate of a vehicle 120. As illustrated in FIG. 7, the tailgate is in the closed state and multiple modular accessories 134a-134c are attached to the vehicle pad 102. The vehicle pad 102 may include a fifth layer 118 and a fourth layer 135. The fifth layer 118 may be the same or similar to the fifth layer discussed above in relation to FIGS. 1A-1C. The fourth layer 135 may be the same or similar to the fourth layer discussed above in relation to FIGS. 1A-1C.

The vehicle pad 102 may include a molle webbing device 115. The molle webbing device 115 may include a first molle strap 370a and a second molle strap 370b (collectively 'molle straps 370'). The modular accessories 134a-134c may be attached to the vehicle pad 102 using the molle webbing device 115 as discussed elsewhere herein.

When attached to the vehicle pad 102, the modular accessories 134a-134c may be adjacent to portion of an eighth surface 254 of the fifth layer 118 and/or a portion of the fourth layer 135 of the vehicle pad 102. When the tailgate is moved between the closed position and the open position, the vehicle pad 102 with the modular accessories 134a-134c attached may move with the tailgate.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle pad, comprising:
   at least a first layer that defines a layer hole positioned to permit access to a handle of a vehicle;
   a plurality of attachment devices, each attachment device of the plurality of attachment devices positioned within a different attachment pocket defined by the at least the first layer;
   one or more webbing straps comprising a first end and a second end, the webbing straps configured to pass through a hinge gap of a vehicle and the first end configured to attach to a first attachment device and the second end configured to attach to a second attachment device, the one or more webbing straps configured to secure the vehicle pad to the vehicle; and a locking device comprising a first lock strap, a second lock strap, and a locking piece, the second lock strap attached to the locking piece and positioned adjacent to at least one surface of the at least the first layer and the first lock strap attached to the second lock strap and configured to pass through the hinge gap and attach to the locking piece, the locking device configured to lock the vehicle pad to the vehicle.

2. The vehicle pad of claim 1, the attachment devices comprising a plurality of tension locks configured to maintain tension on the webbing straps when the vehicle pad is secured to the vehicle.

3. The vehicle pad of claim 1, each attachment device of the plurality of attachment devices attached to a different attachment strap positioned adjacent to at least one surface of the at least the first layer.

4. The vehicle pad of claim 1, the locking piece comprising a locking carabiner positioned in a locking device pocket defined by the at least the first layer.

5. The vehicle pad of claim 1, the at least the first layer comprising:
a second layer, a first surface of the second layer in contact with a second surface of the first layer and the second layer defines a second layer hole positioned to permit access to the handle;
a third layer, a first surface of the third layer in contact with a first portion of a second surface of the second layer;
a fourth layer, a first surface of the fourth layer in contact with a second portion of the second surface of the second layer; and
a fifth layer, a first surface of the fifth layer in contact with a third portion of the second layer and a portion of a second surface of the third layer and a portion of a second surface of the fourth layer and the fifth layer defines a fifth layer hole positioned to permit access to the handle.

6. The vehicle pad of claim 1, the second lock strap of the locking device comprising a strap extending from the locking piece to a second edge of the at least the first layer.

7. The vehicle pad of claim 1, the vehicle pad further comprising a plurality of bump-out straps attached to at least one surface of the at least the first layer and located at different positions, the bump-out straps attached to be adjacent to a third side of the vehicle when the vehicle pad is secured to the vehicle.

8. The vehicle pad of claim 7, the plurality of bump-out straps positioned between thirty cm and seventy cm from a first edge of the at least the first layer.

9. The vehicle pad of claim 7, the vehicle pad further comprising a payload strap configured to pass between one or more of the bump-out straps and at least one surface of the at least the first layer to adjust a size and position of a payload loop using the bump-out straps, the payload loop permits a payload to be secured to the vehicle pad.

10. The vehicle pad of claim 1, the vehicle pad further comprising a molle webbing device attached to at least one surface of the at least the first layer, the molle webbing device attached to be adjacent to a second surface of the vehicle when the vehicle pad is secured to the vehicle and the molle webbing device configured to attach modular accessories to the vehicle pad.

11. The vehicle pad of claim 10, the molle webbing device comprising two molle straps positioned parallel relative to each other and to a second edge of the at least the first layer and each molle strap forms a plurality of webbing loops configured to receive molle attachment devices.

12. The vehicle pad of claim 10, the molle webbing device attached to at least one surface of the at least the first layer between zero and seventy centimeters (cm) from a second edge of the at least the first layer.

13. The vehicle pad of claim 1, the layer hole is defined to have a width of thirty five cm and a length of 17.3 cm.

14. The vehicle pad of claim 13, the layer hole is defined to be located between zero cm and seventy cm from a first edge of the at least the first layer.

15. The vehicle pad of claim 1, the vehicle pad further comprising an edging configured to bind the at least the first layer along a perimeter of the vehicle pad.

16. The vehicle pad of claim 1, the at least the first layer comprising at least one of a polyester felt material, a foam material, and a laminated nylon material.

17. The vehicle pad of claim 1, the vehicle pad has an overall length of 108.5 cm.

18. A vehicle pad, comprising:
a first layer;
a second layer, a first surface of the second layer in contact with a second surface of the first layer;
a third layer that includes a first portion and a second portion, a first surface of the first portion in contact with a first portion of a second surface of the second layer and a first surface of the second portion in contact with a second portion of the second surface of the second layer;
a fourth layer, a first surface of the fourth layer in contact with a third portion of the second layer and a portion of a second surface of the first portion of the third layer and the first surface in contact with a portion of a second surface of the second portion; and
a locking device comprising a first lock strap, a second lock strap, and a locking piece, the second lock strap attached to the locking piece and positioned between the second surface of the second layer and the first surface of the fourth layer and the first lock strap attached to the second lock strap and configured to pass through a hinge gap and attach to the locking piece to lock the vehicle pad to a vehicle.

19. The vehicle pad of claim 18, the vehicle pad further comprising:
a plurality of attachment devices, each attachment device of the plurality of attachment devices positioned within a different attachment pocket defined by the first portion of the third layer and the fourth layer or the second portion of the third layer and the fourth layer; and
one or more webbing straps configured to pass through a hinge gap, a first end of each of the one or more webbing straps configured to attach to a first attachment device and a second end of each of the one or more webbing straps configured to attach to a second attachment device to secure the vehicle pad to the vehicle.

20. A truck pad, comprising:
a first layer that defines a first layer hole positioned to permit access to a tailgate handle of a tailgate;
a second layer, a first surface of the second layer in contact with a second surface of the first layer and the second layer defines a second layer hole positioned to permit access to the tailgate handle;
a third layer, a first surface of the third layer in contact with a first portion of a second surface of the second layer;

a fourth layer, a first surface of the fourth layer in contact with a second portion of the second surface of the second layer;

a fifth layer, a first surface of the fifth layer in contact with a third portion of the second layer and a portion of a second surface of the third layer and a portion of a second surface of the fourth layer and the fifth layer defines a fifth layer hole positioned to permit access to the tailgate handle;

an edging configured to bind the first layer, the second layer, the third layer, the fourth layer, and the fifth layer along a perimeter of the truck pad;

a plurality of bump-out straps attached to the second surface of the fifth layer and located at different positions, the bump-out straps attached to be adjacent to a third side of the tailgate when the truck pad is secured to the tailgate;

a payload strap configured to pass between one or more of the bump-out straps and the fifth layer to adjust a size and position of a payload loop using the bump-out straps, the payload loop configured to permit a payload to be secured to the truck pad;

a molle webbing device attached to the second surface of the fifth layer, the molle webbing device attached to be adjacent to a second side of the tailgate when the truck pad is secured to the tailgate and the molle webbing device configured to attach modular accessories to the truck pad;

a plurality of tension locks, each tension lock of the plurality of tension locks positioned within a different attachment pocket defined by the third layer and the fifth layer or the fourth layer and the fifth layer;

one or more webbing straps comprising a first end and a second end, the webbing straps configured to pass through a tailgate hinge gap and the first end configured to attach to a first tension lock and the second end configured to attach to a second tension lock to secure the truck pad to the tailgate and the tension locks configured to maintain tension on the webbing straps when the truck pad is secured to the tailgate; and a locking device comprising a first lock strap, a second lock strap, and a locking carabiner, the second lock strap attached to the locking carabiner and positioned between the second surface of the second layer and the first surface of the fifth layer and the first lock strap attached to the second lock strap and configured to pass through the tailgate hinge gap and attach to the locking carabiner to lock the truck pad to the tailgate.

\* \* \* \* \*